United States Patent [19]

Murakoshi

[11] Patent Number: 5,099,327
[45] Date of Patent: Mar. 24, 1992

[54] VIDEO SCANNING CONVERSION APPARATUS

[75] Inventor: Satoshi Murakoshi, Atsugi, Japan

[73] Assignee: Kabushiki Kaisha Yamashita Denshi Sekkei, Atsugi, Japan

[21] Appl. No.: 537,235

[22] Filed: Jun. 13, 1990

[30] Foreign Application Priority Data

Dec. 22, 1989 [JP] Japan ................... 1-333367

[51] Int. Cl.$^5$ ............................................. H04N 7/01
[52] U.S. Cl. ................................. 358/140; 358/160
[58] Field of Search ........... 358/140, 11, 160, 138, 358/451; 340/799, 815

[56] References Cited

U.S. PATENT DOCUMENTS

| | | | |
|---|---|---|---|
| 2,916,211 | 12/1959 | Schulze et al. | 235/160 |
| 3,509,330 | 4/1970 | Batte | 235/175 |
| 3,594,565 | 7/1971 | Ragen | 235/160 |
| 4,054,914 | 10/1977 | Fukuoka | 358/140 X |
| 4,292,653 | 9/1981 | Bock et al. | 358/140 |
| 4,302,776 | 11/1981 | Taylor et al. | 358/180 X |
| 4,866,520 | 9/1989 | Nomura et al. | 358/140 |
| 4,956,707 | 9/1990 | Oakley et al. | 358/140 |

*Primary Examiner*—Victor R. Kostak
*Attorney, Agent, or Firm*—Fleit, Jacobson, Cohn, Price, Holman & Stern

[57] ABSTRACT

An inputted video signal is memorized in a memory. The number of scanning lines of the memorized video signal is converted to any number and read out from the memory. An ordinal numeral R of the scanning line to be outputted is divided by a converting rate N and an integral number W is obtained from the quotient R/N by counting fractions over one-half as one and disregarding the rest. The scanning line with an ordinal numeral corresponding to the integral number W is read out from the memory as the outputted scanning line with the ordinal numeral R.

6 Claims, 2 Drawing Sheets

VIDEO SCANNING CONVERSION APPARATUS

BACKGROUND OF THE INVENTION

The invention relates to a video signal processing apparatus for converting the number of the horizontal scanning lines in a frame of an inputted video signal and for outputting a new video signal with the converted numbers of the scanning lines in the frame.

At present there are many kinds of computerized converting systems and the number of scanning lines in the frame of the image plane in the systems are different from each other. Therefore, when an image produced by one system is displaced in another system, conversion of the number of scanning lines in the frame are necessary. For example, when an image produced by a computer graphics (CG) system or computer aided design (CAD) system is displayed in a television receiver in a format of NTSC, PAL, SECAM, HDTV and so on, the number of scanning lines in the frame must be increased or decreased.

In the prior art, such a conversion is performed by an apparatus which is especially designed for one input system and another output system. Accordingly, the apparatus can not be available for conversion of the images of different systems. In other words, a special apparatus is necessary for each system conversion

SUMMARY OF THE INVENTION

An object of the invention is to eliminate the difficulties mentioned above.

Another object of the invention is to provide a video signal processing apparatus which is available to any system.

According to the invention, there is provided a video signal processing apparatus to which at least one frame of a video signal comprising a plurality of scanning lines is inputted and which outputs at least one frame of a new video signal comprising a converted number of scanning lines, wherein the apparatus comprises a memory means for memorizing at least one frame of the inputted video signal, an operating means for being operated to input a conversion rate N to convert the number of the scanning lines, a controlling means for dividing an ordinal numeral R of the scanning line to be outputted by the converting rate N and obtaining from the quotient R/N an integral number W, and a reading controlling means for controlling the memory means in accordance with outputs of the controlling means so that the scanning lines with an ordinal numeral corresponding to the integral number W is read out from the memory means as the outputted scanning line with the ordinal numeral R.

Because the ordinal numeral of the scanning line to be outputted is divided by the inputted conversion rate and the scanning line with the ordinal numeral corresponding to the integral number obtained from the quotient is read out from the memory, the inputted video signal, comprising a predetermined number of scanning lines, can be converted to the outputted video signal, comprising the converted number of scanning lines, in spite of the number of the scanning lines of the inputted and outputted video signals. The conversion rate can be serially varied.

DETAILED DESCRIPTION OF THE PREFERRED EMBODIMENT

Figure 1:
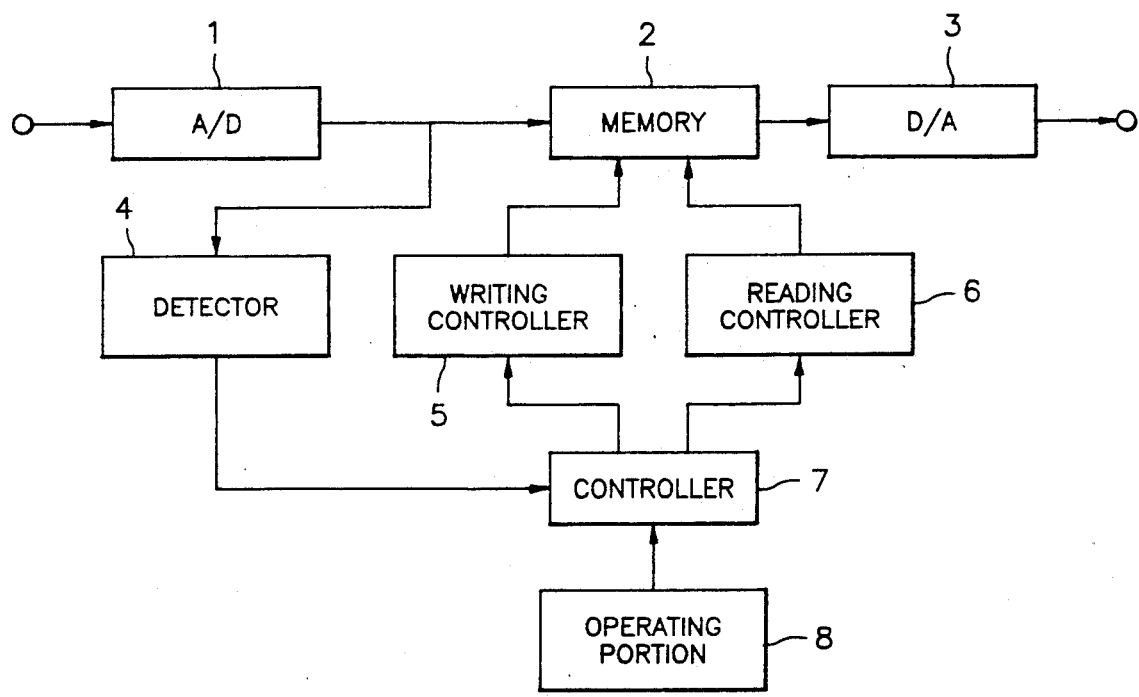
FIG. 1 is a block diagram showing a structure of an embodiment of a video signal processing apparatus according to the invention.

Referring to FIG. 1, an inputted video signal is applied through A/D converter 1 to a memory 2 and a line and frequency detector 4. An output of the memory 2, in which at least one frame of video signal is memorized, is provided through D/A converter 3 to an apparatus not shown, e.g. a monitor.

The writing and reading operations of the memory 2 are controlled by a writing controller 5 and a reading controller 6, respectively, and the writing controller 5 and the reading controller 6 are in turn controlled by a controller 7 which comprises a microcomputer for example. Outputs of the detector 4 and an operating portion 8 are inputted to the controller 7.

Now the operation will be described below.

The inputted analog video signal is converted to a digital video signal by the A/D converter 1 and the digital video signal is supplied to the detector 4 and the memory 2.

The detector 4 detects a number of horizontal scanning lines in one frame and the number of the frames per second of the inputted digital video signal and outputs the detection results to the controller 7. Although, in this embodiment, the digital video signal is inputted to the detector 4, the numbers of scanning lines and frame can be detected from the analog video signal.

The controller 7 controls the writing controller 5 so that the writing controller 5 generates writing clock pulses with a predetermined frequency in accordance with the numbers of the scanning lines and frame detected by the detector 4. The digital video signal supplied from the A/D converter 1 is written and memorized in the memory 2 synchronous with the writing clock pulses applied from the writing controller 5.

Figure 2:
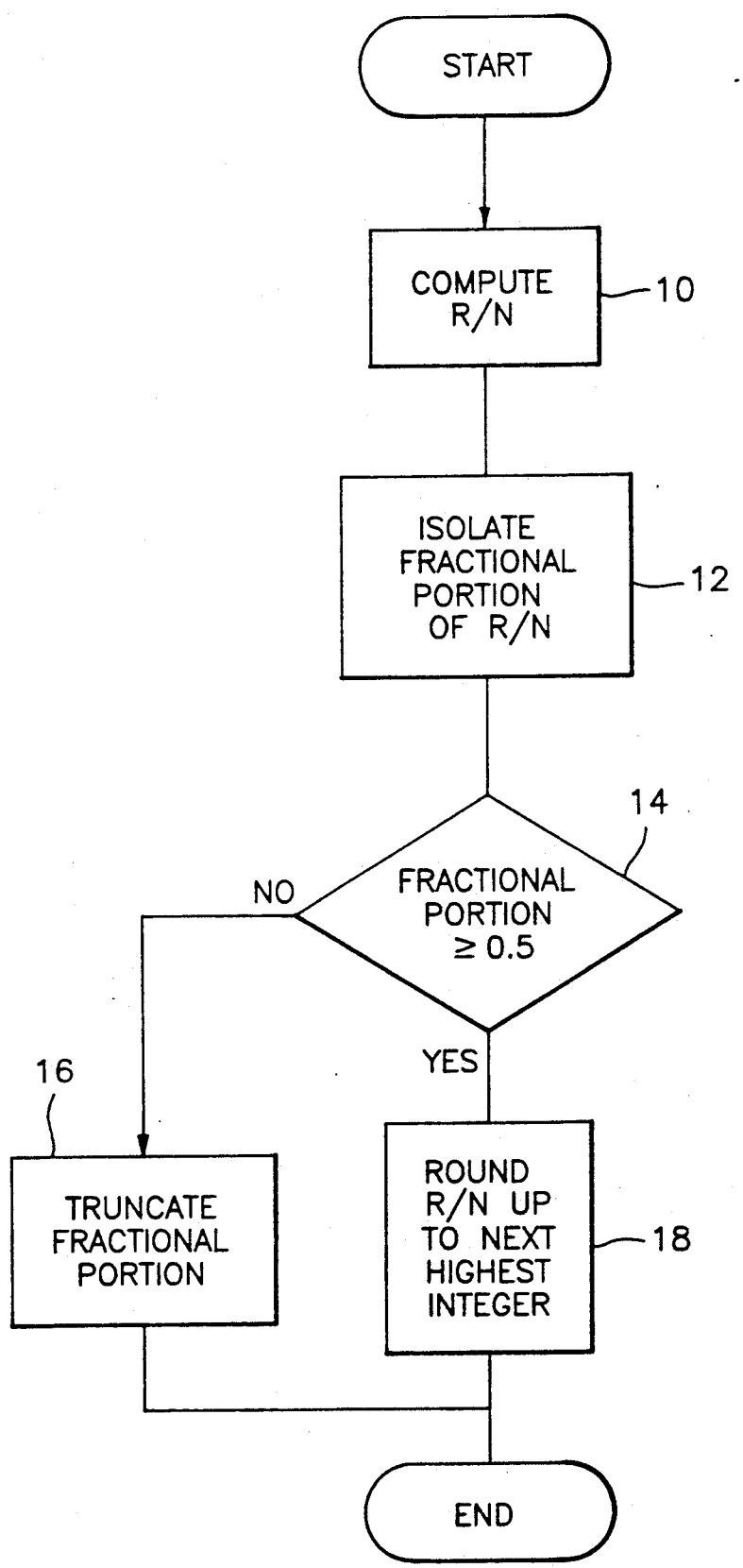
FIG. 2 is a flowchart illustrating the round off computation performed by the controller of the apparatus according to the present invention.

Also, in the controller 7, a conversion rate N for increasing or decreasing the number of the scanning lines of the video signal is inputted by operation of the operating portion 8. The controller 7 performs division and round off computations, which are depicted by the flowchart of FIG. 2. When the controller 7 reads out the memorized video signal from the memory 2, where a new number (ordinal numeral) of one scanning line of the video signal to be read out from the memory 2 is R, the controller 7 performs such an operation that the number R is divided by the conversion rate N (step 10) and an integral number W is obtained from the quotient (R/N) by counting fractions over one-half as one and disregarding the rest, as represented by steps 12-18. Furthermore, the controller 7 controls the memory 2 through the reading controller 6 so that the scanning lines with the number (ordinal numeral) equal to the integral number W is read out from the memory 2 as the new scanning line with the number (ordinal numeral) R.

For example, when the number of the scanning lines of the inputted video signal is decreased to 1/1.2 times the original number, i.e. $N=1/1.2$, the operation as shown in Table 1 is performed. Also, when the number of the scanning lines of the inputted video signal is increased to 1.2 times number, i.e., N=1.2, the operation as shown in Table 2 is performed.

As shown in Table 1, the new number R (1 to 10) of each scanning line outputted from the memory 2 is divided by the conversion rate N (=1/1.2) and the integral number W is obtained from the quotient R/n by counting fractions over one-half as one and disregarding the rest. For example, where the new number R of the scanning line is 3, then the quotient R/N is 3.6 and the integral number W is 4. Also, where the new number R of the scanning line is 6, then the quotient R/N is 7.2 and the integral number W is 7. Therefore, the scanning lines with the original numbers 4 and 7 are read out from the memory 2 as the new scanning lines with the numbers 3 and 6.

TABLE 1

| READ-OUT SCANNING LINE NUMBER R | QUOTIENT (R/N) | WRITTEN SCANNING LINE NUMBER W |
|---|---|---|
| 1 | 1.2 | 1 |
| 2 | 2.4 | 2 |
| 3 | 3.6 | 4 |
| 4 | 4.8 | 5 |
| 5 | 6.0 | 6 |
| 6 | 7.2 | 7 |
| 7 | 8.4 | 8 |
| 8 | 9.6 | 10 |
| 9 | 10.8 | 11 |
| 10 | 12.0 | 12 |

Thus in this embodiment, among the 12 scanning lines written in the memory 2, the scanning lines with the numbers 3 and 9 are eliminated and the rest 10 with the numbers 1, 2, 4 to 8, and 10 to 12 are read out as the new scanning lines with the numbers 1 to 10.

TABLE 2

| READ-OUT SCANNING LINE NUMBER R | QUOTIENT (R/N) | WRITTEN SCANNING LINE NUMBER W |
|---|---|---|
| 1 | 0.8 | 1 |
| 2 | 1.7 | 2 |
| 3 | 2.5 | 3 |
| 4 | 3.3 | 3 |
| 5 | 4.2 | 4 |
| 6 | 5.0 | 5 |
| 7 | 5.8 | 6 |
| 8 | 6.7 | 7 |
| 9 | 7.5 | 8 |
| 10 | 8.3 | 8 |

In the Table 2, the new number R (1 to 10) of each scanning lines outputted from the memory 2 is divided by the conversion rate N (=1.2) and the integral number W is obtained from the quotient R/N by treating fractions over one-half as the next highest integer and by truncating fractions of less than one-half. For example, where the new number R of the scanning line is 4, then the quotient R/N is 3.3 and the integral number W is 3. Also, where the new number R of the scanning line is 7, then the quotient R/N is 5.8 and the integral number W is 6. Therefore, the scanning lines with the original numbers 3 and 6 are read out from the memory 2 as the new scanning lines with the numbers 4 and 7.

In other words, in thsi embodiment, among the 8 scanning lines with the original numbers 1 to 8 written in the memory 2, the scanning lines with the numbers 3 and 8 are read out twice respectively and the 10 scanning lines are read out as the scanning lines with the new numbers 1 to 10.

The digital video signal read out from the memory 2 is converted to the analog bideo signal by the D/A converter 3 and outputted to a CRT not shown, for instance.

Since the increase and decrease of the scanning lines are performed on the average on one image plane by this process, the image comprising the new numbers of scanning lines is prevented from being enlarged or reduced.

The explanation of the frame conversion is described below.

The operating portion 8 is also operated to input the number of the frame to be converted. The controller 7 controls the reading controller 6 so that the reading controller 6 generates reading clock pulses in compliance with the numbers of the scanning lines and frame inputted from the operating portion 8. The memory 2 is constructed such that the writing operation and the reading operation can be performed independently. Therefore, the video signal memorized in the memory 2 can be read out as the new video signal with the new frame number in synchronism with the reading clock pulses.

The operation described above can be performed in spite of the numbers of the scanning lines and frame and the conversion rate of the inputted and outputted video signals. Therefore, the numbers of scanning lines and frame can be converted at any rate.

Although the integral number W is obtained by counting fractions over one-half as one and disregarding the rest in the embodiment described above, it can be obtained by omission of fractions or counting fractions as one. Also, in the above embodiment, the numbers of the scanning lines and frame are automatically detected by the detector 4, they can be inputted from the operating portion 8.

What is claimed is:

1. A video signal processing apparatus to which at least one frame of a video signal comprising a plurality of scanning lines is inputted and which is outputs at least one frame of a new video signal comprising a converted number of scanning lines, wherein the apparatus comprises
   a memory means for memorizing at least one frame of the inputted video signal,
   an operating means for being operated to input a conversion rate N to convert the number of the scanning lines of said one frame,
   a controlling means for dividing an ordinal numeral R of the scanning line to be outputted by the conversion rate N and obtaining from the quotient R/N an integral number W,
   a detecting means for detecting the number of the scanning lines of the inputted video signal and outputting a detecting signal indicative of the detected number to the controlling means,
   a reading controlling means for controlling the memory means in accordance with outputs of the controlling means so that the scanning line with an ordinal numeral corresponding to the integral number W is read out from the memory means as the outputted scanning line with the ordinal number R.

2. A video signal processing apparatus according to claim 1, wherein the controlling means obtains the integral number W from the quotient R/N by counting fractions over one-half as one and disregarding the rest.

3. A video signal processing apparatus according to claim 1, wherein the controlling means obtains the integral number W from the quotient R/N by counting fractions as one.

4. A video signal processing apparatus according to claim 1, wherein the controlling means obtains the integral number W from the quotient R/N by omission of fractions.

5. A video signal processing apparatus according to claim 1, wherein the apparatus further comprises an A/D converting means for converting the inputted video signal from an analog signal to a digital signal.

6. A video signal processing apparatus according to claim 1, wherein the apparatus further comprises a writing controlling means for controlling the memory means so that at least one frame of the inputted video signal is written in the memory means.

* * * * *